(12) United States Patent
Morse et al.

(10) Patent No.: US 11,699,579 B2
(45) Date of Patent: Jul. 11, 2023

(54) MASS SPECTROMETRY SYSTEM

(71) Applicant: APPLIED SCIENCE & TECHNOLOGY SOLUTIONS LTD, Cranfield (GB)

(72) Inventors: Andrew David Morse, Cranfield (GB); Geraint Huw Morgan, Cranfield (GB); Simon Sheridan, Cranfield (GB)

(73) Assignee: APPLIED SCIENCE & TECHNOLOGY SOLUTIONS LTD, Cranfield (GB)

( * ) Notice: Subject to any disclaimer, the term of this patent is extended or adjusted under 35 U.S.C. 154(b) by 111 days.

(21) Appl. No.: 17/264,060

(22) PCT Filed: Jul. 11, 2019

(86) PCT No.: PCT/GB2019/051943
§ 371 (c)(1),
(2) Date: Jan. 28, 2021

(87) PCT Pub. No.: WO2020/030886
PCT Pub. Date: Feb. 13, 2020

(65) Prior Publication Data
US 2021/0287890 A1    Sep. 16, 2021

(30) Foreign Application Priority Data
Aug. 7, 2018 (GB) ...................... 1812799

(51) Int. Cl.
*H01J 49/02* (2006.01)
*H01J 49/14* (2006.01)
(Continued)

(52) U.S. Cl.
CPC .......... *H01J 49/022* (2013.01); *H01J 49/147* (2013.01); *H01J 49/26* (2013.01); *H04W 84/18* (2013.01)

(58) Field of Classification Search
CPC ........ H01J 49/022; H01J 49/147; H01J 49/26; H01J 49/025; H04W 84/18
See application file for complete search history.

(56) References Cited

U.S. PATENT DOCUMENTS 4,181,852 A * 1/1980 Berthod .................. H01J 49/18
250/293
6,351,983 B1 * 3/2002 Haas .................. G01N 30/7206
250/281
(Continued)

FOREIGN PATENT DOCUMENTS

EP       2871665 A1    5/2015
WO    2006002027 A2    1/2006
(Continued)

OTHER PUBLICATIONS

Duan, et al, "Development of a New High-Efficiency Thermal Ionization Source for Mass Spectrometry", International Journal of Mass Spectrometry and Ion Processes, Elsevier Scientific Publishing Co., Amsterdam, NL, vol. 161, No. 1, 1997, p. 27-39 (Year: 1997).*
Dr Dilwyn Williams / Intellectual Property Office, Search Report under Section 17 for Application No. GB1812799.3, dated Feb. 15, 2019.
(Continued)

*Primary Examiner* — David E Smith
(74) *Attorney, Agent, or Firm* — Bochner IP, PLLC; Andrew D. Bochner

(57) ABSTRACT

A mass spectrometer system (10) is provided in which the voltage controller (12) can have separate first and second high-voltage control circuits (34, 40) which are physically disconnected from and at different ground planes to one another. Communication between the first and second high-voltage control circuits (34, 40) is enabled via an interface circuit (30) and one or more wireless, preferably radio-frequency, communicators (38, 44, 46, 48).

16 Claims, 2 Drawing Sheets

Figure 1:
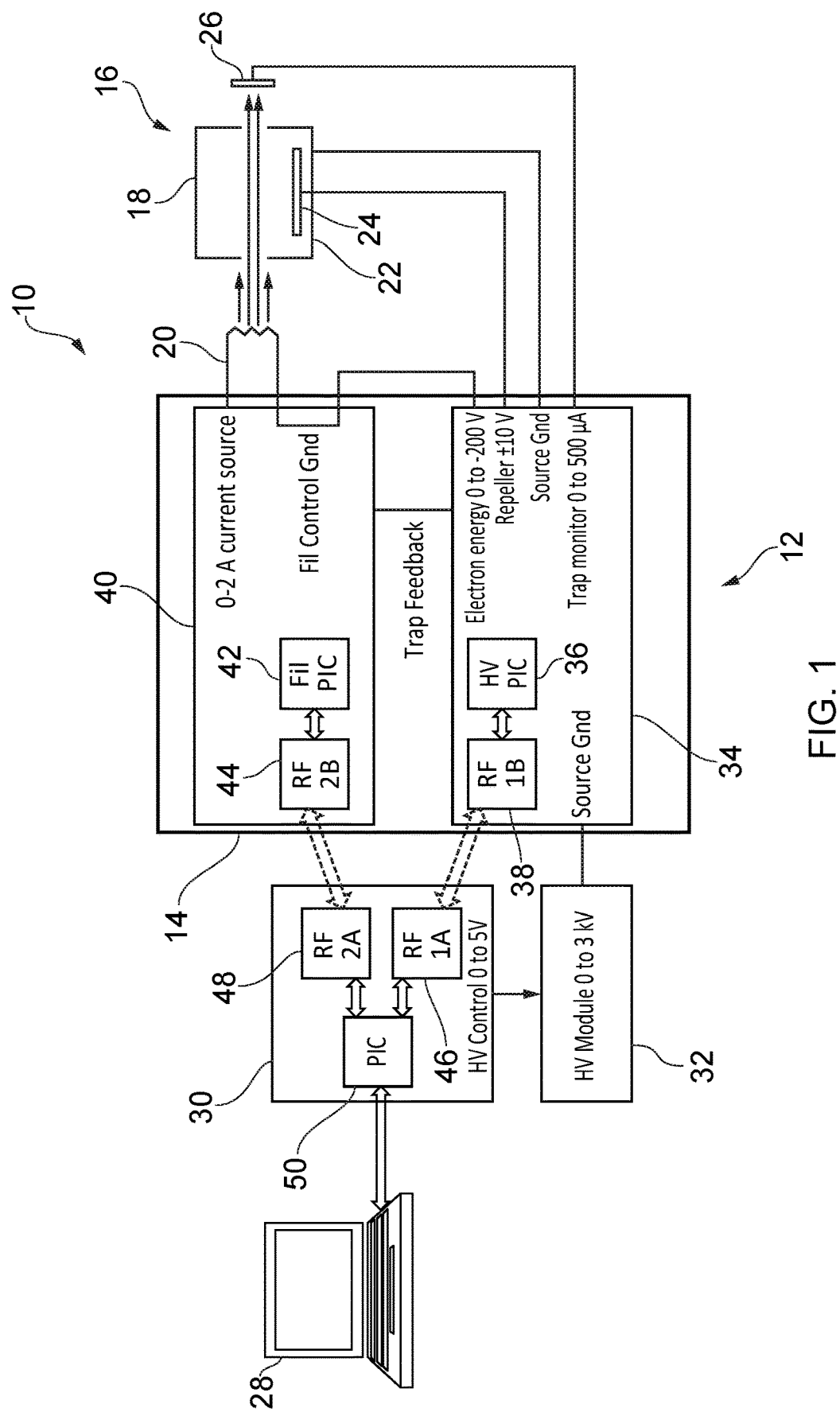

(51) Int. Cl.
*H01J 49/26* (2006.01)
*H04W 84/18* (2009.01)

(56) References Cited

U.S. PATENT DOCUMENTS

| 2005/0051720 | A1 | 3/2005 | Knecht et al. | |
|---|---|---|---|---|
| 2011/0140512 | A1 | 6/2011 | Pino et al. | |
| 2013/0319862 | A1* | 12/2013 | Kotowski | G01N 27/44704 |
| | | | | 204/603 |
| 2014/0375209 | A1* | 12/2014 | Russ | H01J 27/205 |
| | | | | 315/111.91 |

FOREIGN PATENT DOCUMENTS

| WO | 2012125318 | A2 | 9/2012 | | |
|---|---|---|---|---|---|
| WO | 2013063502 | A2 | 5/2013 | | |
| WO | WO-2019229450 | A1 * | 12/2019 | | G01N 30/7206 |

OTHER PUBLICATIONS

Loiseleur, Pierre / European Patent Office, International Search Report and Written Opinion for International Application No. PCT/GB2019/051943, dated Oct. 23, 2019.
Dayu Li et al, 'Design of arbitrary waveform generator based on FPGA and Wi-Fi for miniature mass spectrometer', IEEE 2017 10th International Congress on Image and Signal Processing, BioMedical Engineering and Informatics (CISP-BMEI). Proceedings, Oct. 14-16, 2017, 5 pages, ISBN 978-1-5386-1937-7.
Duan Y et al, "Development of a new high-efficiency thermal ionization source for mass spectrometry," International Journal of Mass Spectrometry and Ion Processes, Elsevier Scientific Publishing Co. Amsterdam, NL, vol. 161, No. 1, Feb. 1, 1997 (Feb. 1, 1997), pp. 27-39, XP004058795, ISSN: 0168-1176, DOI: 10.1016/S0168-1176(96)04434-5.
Liang Gao et al, "Design and Characterization of a Multisource Hand-Held Tandem Mass Spectrometer", Analytical Chemistry, vol. 80. No. 19, Oct. 1, 2008 (Oct. 1, 2008), pp. 7198-7205, XP055071202, ISSN: 0003-2700, DOI: 10.1021/ac801275x.

* cited by examiner

MASS SPECTROMETRY SYSTEM

The present invention relates to a mass spectrometry system having an improved voltage controller arrangement. The invention further relates to a mass spectrometry voltage controller.

Mass spectrometry is a well-developed scientific analytical technique, which utilises the ionization and acceleration of chemical species to sort the ions generated in accordance with their mass-to-charge ratio. The resultant mass spectrum is then able to plot the ion signal as a function of the mass-to-charge ratio, allowing for detailed analysis of the chemical composition of the sample analysed.

Ionization, typically by electron bombardment of the sample, will usually occur in a region between several electrodes at high voltages, with a voltage gradient providing the necessary acceleration to the ions. For instance, in a magnetic sector mass spectrometer, the acceleration is undertaken along a flight tube; the greater the flight distance, the greater the spread of ions according to their mass-to-charge ratio, and the better the resolution of the mass spectrum. Other types of mass spectrometer are available, using alternative means of ion separation.

The improvement in the resolution achieved when a large flight is available has led to commercial mass spectrometers being large immobile machines. Samples must therefore be brought to the mass spectrometer for analysis. It may, however, be useful to provide a portable mass spectrometer which can be brought to a particular location for analysis. This would allow mass spectrometry to become more widely available in other contexts, for example, in the medical area.

One difficulty in realising a portable mass spectrometer is the need for high voltages to be provided to the ion source for the acceleration of the ions, which are typically of the order of 0 to 5 kV. Such voltages present significant risks to users unless a safe housing arrangement can be found. Similarly, the presence of high-voltage components in the vicinity of lower-voltage components, or components at high-voltage having a different ground plane, can lead to voltage flash-overs, irreparably damaging the lower-voltage components, in particular, any control processors of the system.

Isolation of high- and low-voltage components in existing arrangements is typically provided by the use of opto-isolators, which allow communications to be transmitted optically between the respective circuit boards. However, opto-isolators are large discrete components, limiting the possibility for constructing a portable controller, and are also prone to failure under high-voltage operating conditions.

Additionally, given the need to isolate high voltages for safety, in order to perform diagnostics on the mass spectrometry controller, a large number of connections must be provided on a high-voltage boards. This drastically increases the complexity and failure risk of such systems.

The present invention seeks to provide a voltage controller arrangement for a mass spectrometer which can be utilised to achieve a portable mass spectrometry system.

According to a first aspect of the invention, there is provided a mass spectrometry system comprising: a mass spectrometer having an ion source having a plurality of high-voltage inputs of different voltages; a first high-voltage control circuit having a microcontroller and a first high-voltage-circuit wireless communicator, the first high-voltage control circuit being configured to control a power supply to at least one of the plurality of high-voltage inputs of the ion source; a second high-voltage control circuit having a microcontroller and a second high-voltage-circuit wireless communicator, the second high-voltage control circuit being configured to control a power supply to at least one of the plurality of high-voltage inputs of the ion source; and an interface circuit comprising wireless communication means, and a microcontroller which is in communication with the wireless communication means; wherein the first and second high-voltage control circuits are physically spaced apart from and are at different ground planes to one another, the interface circuit providing communication therebetween by communication between the wireless communication means and the first and second high-voltage wireless communicators.

The present invention enables the control and monitoring of voltages and currents on a mass spectrometer high-voltage control circuit by the use of the wireless communicators interacting through the interface circuit. Control signals can therefore be safely passed between the first and second high-voltage control circuits at different potentials without needing a direct and potentially dangerous physical bridge therebetween. This improves the safety of the voltage controller for the mass spectrometer, making the possibility of a portable mass spectrometer more achievable. The communication between circuits at different voltage potential requires no physical connection, is easier to implement, and is also safer for a user. Having boards have ground planes at different voltages increases the risk of voltage flash-over. The isolation of the circuits from one another using the wireless communication means mitigates this risk.

Preferably, at least one of the first and second high-voltage-circuit wireless communicator and wireless communication means may comprise a radio-frequency communication module.

Radio-frequency communicators provide a simple mechanism of interfacing the various circuits of the system, safely isolating the delicate controls of the mass spectrometer and control computer from the high voltages needed for the ion source.

Optionally, the system may further comprise a circuit housing unit, the first high-voltage control circuit and the second high-voltage control circuit being housed within the circuit housing unit in a spaced apart configuration.

Whilst there is a need to provide a physical separation between the first and second high-voltage control circuit to prevent voltage flash-overs, the circuits can be safely co-located within a single housing, thereby providing a portable high-voltage controller for a mass spectrometer.

A power control unit may also be provided which is separate to the circuit housing unit.

The high-voltage controller of the present invention may advantageously be compatible with existing off the shelf power supply arrangements, which may allow the present system to be retrofittable to existing mass spectrometry systems.

The mass spectrometry system may preferably have dimensions of less than or equal to 60 cm×60 cm×25 cm. The circuit housing unit may preferably have dimensions of less than or equal to 45 cm×25 cm×15 cm, and more preferably have dimensions of less than or equal to 21 cm×20 cm×8 cm. Furthermore, there may preferably be a spacing of at least 5 cm between side walls of a housing for the mass spectrometry system and the circuit housing unit.

Portability is one of the main factors in the development of the present invention, and therefore it is intended that the complete system, inclusive of the voltage controller be sized to be readily carried by a user, preferably having dimensions no greater than that of a standard desktop PC chassis. Keeping the circuit housing unit small then also allows it to be safely stowed away from the edges of any housing for the mass spectrometry system, which improves safety by reducing the risk of errant fingers coming into contact with the high-voltage control circuits. This also reduces the likelihood of ingress of contaminants such as moisture, which could otherwise damage the high-voltage components.

Optionally, the mass spectrometry system may further comprise a high-voltage power supply connected to the at least one of the first and second high-voltage control circuits.

The use of high voltage power supplies within the system allows for the necessary high voltages for the ion source to be readily obtained in a safe and self-contained manner.

The second high-voltage control circuit may comprise an ionization source filament control circuit for controlling an ionization filament of the ion source.

The filament control circuit is typically at a ground plane between 0V and 200V, typically of the order of 75V, below that of the electrode array, which can result in an increased propensity towards discharging. The present invention obviates this issue.

There may preferably be provided at least one circuit-status monitoring device associated with the first and/or second high-voltage control circuits.

The advantage of a single voltage controller in which signal communications are routed from all circuits via a single interface circuit is that status checks and feedback can be received from the various components of the system, allowing for system analysis to be performed via a graphical user interface of the control computer.

A voltage-protection device may be provided which is associated with at least one of the microcontrollers. The or each voltage-protection device may comprise any or all of: a diode; a capacitor; and a transient voltage suppressor.

Whilst the present system has the advantage of reducing the size of the voltage controller by eliminating opto-isolators, the inclusion of the delicate microprocessors and wireless communicators run the risk of being damaged by voltage surges. As such, dedicated protection devices should be considered to mitigate this risk.

Preferably, the wireless communication means of the interface circuit may comprise a first interface wireless communicator and a second interface wireless communicator, the microcontroller being in communication with each of the first and second interface wireless communicators, the interface circuit providing communication between the first and second high-voltage control circuits by communication between the first high-voltage-circuit wireless communicator and the first interface wireless communicator and between the second high-voltage-circuit wireless communicator and the second interface wireless communicator.

The use of two discrete wireless communicators for independently passing signals to the first and second high-voltage control circuits may be simpler to implement than a situation in which a single wireless communicator is required to process and selectively send signals to the different circuits.

The mass spectrometry system may further comprise a control processor which is communicably coupled to the interface circuit.

A simple graphic user interface can be provided on a control computer, with the interface circuit providing the necessary interpretation of the signals to divert control commands to the relevant parts of the voltage controller.

In a preferred arrangement, the first and/or second high-voltage control circuits may be devoid of opto-isolators.

Opto-isolators are bulky components, which are also prone to failure. Removing these components advantageously reduces the size of the voltage controller whilst also improving the robustness thereof.

According to a second aspect of the invention, there is provided a mass spectrometry voltage controller comprising: a first high-voltage control circuit having a microcontroller and a first high-voltage-circuit wireless communicator, the first high-voltage control circuit being configured to control a power supply to at least one high-voltage input of an ion source of a mass spectrometer; a second high-voltage control circuit having a microcontroller and a second high-voltage-circuit wireless communicator, the second high-voltage control circuit being configured to control a power supply to at least one different high-voltage input of the ion source of the mass spectrometer; and an interface circuit comprising a wireless communication means, and a microcontroller which is in communication with the wireless communication means; wherein the first and second high-voltage control circuits are physically spaced apart from one another, the interface circuit providing communication therebetween by communication between the first and second high-voltage-circuit wireless communicator and wireless communications means.

The provision of a voltage controller which can be portably connected to an existing or portable mass spectrometer may be able to revolutionise the usage of mass spectrometry in a wide variety of fields, since the analysis can be attempted outside of the laboratory.

Figure 2:
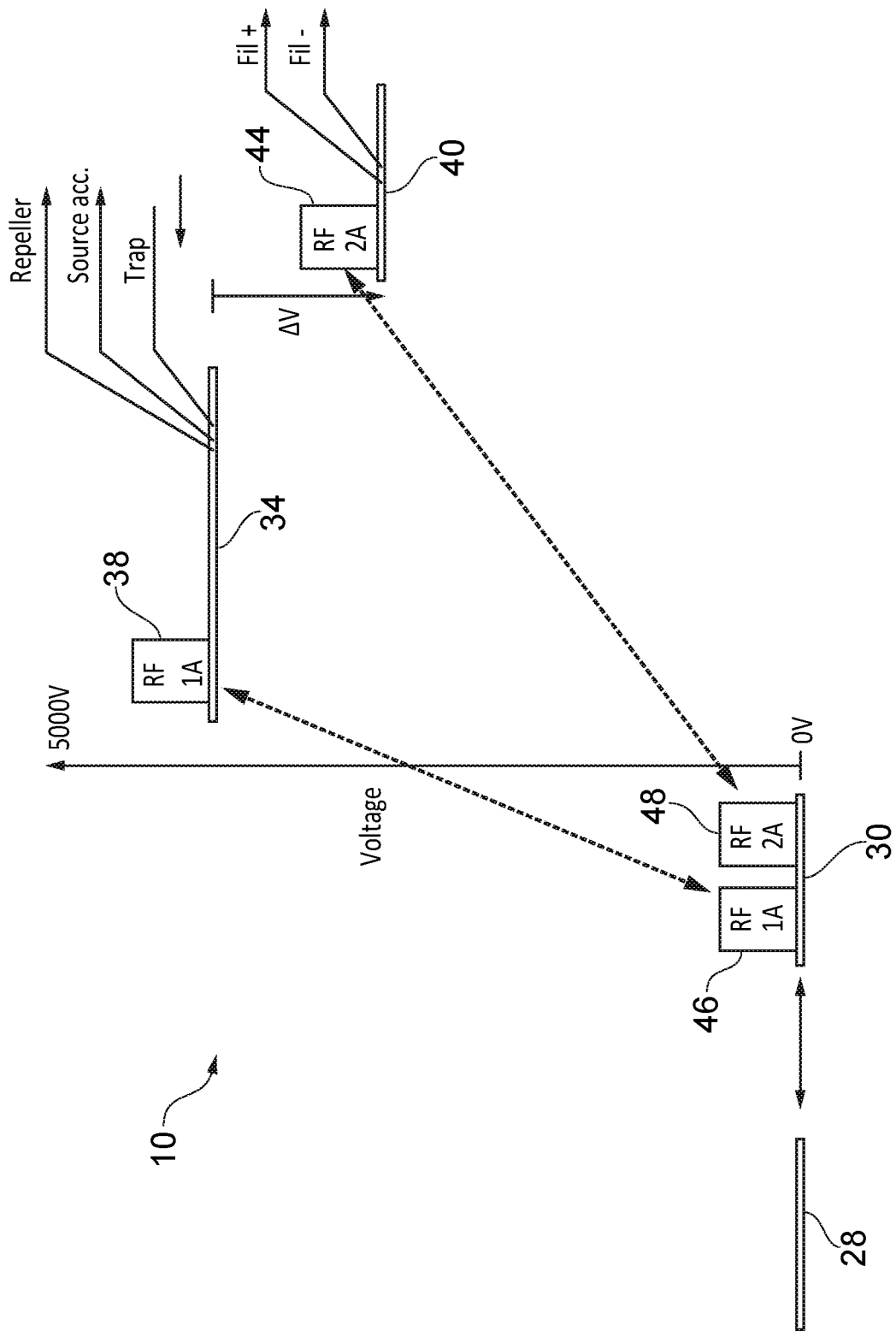

The invention will now be more particularly described, by way of example only, with reference to the accompanying drawing, in which:

FIG. 1 shows a schematic representation of one embodiment of a mass spectrometry system in accordance with the first aspect of the invention; and FIG. 2 shows a diagrammatic representation of the ground potentials of the electrical components of the mass spectrometry system of FIG. 1.

Referring to FIG. 1, there is shown a mass spectrometry system, indicated globally at 10, which has a novel configuration of its voltage controller 12, which is preferably formed as a single module which can be readily transported as part of a portable mass spectrometer.

The voltage controller 12 therefore preferably includes a circuit housing unit 14 within which all of the relevant circuits and power supplies are housed. For portability, it is preferred that the circuit housing unit 14 has dimensions of less than or equal to 45 cm×25 cm×15 cm, and more preferably of less than or equal to 21 cm×20 cm×8 cm. This allows the mass spectrometry system 10 to be provided within a unitary housing itself, with the circuit housing unit 14 self-contained therein. Preferably, the circuit unit 14 is at least 5 cm spaced from the side walls of the housing of the mass spectrometry system 10, in order to prevent accidental touching of the voltage controller 12.

The voltage controller 12 acts to provide a voltage supply to a mass spectrometer 16, in particular, to the ion source 18 thereof. The mass spectrometer 16 comprises an ionization source, such as an ionization filament 20 via which a sample introduced to the mass spectrometer 16 can be ionized, and an acceleration electrode array, usually comprising at least a source grid 22 and a repeller electrode 24. The trap current grid 26 may also be provided, which allows for the measurement of the amount of electrons travelling through the ionizing region of the ion source 18, and is powered via the voltage controller, typically being provided at the just before a flight tube or similar, which is not shown in FIG. 1 for simplicity.

Control commands can be provided to the voltage controller 12 from a control computer 28, which is in communication with an interface circuit 30 capable of relying the commands to the correct components of the voltage controller 12. Control commands may also be passed via the interface circuit 30 to an external power control unit 32, which is directly connectable to the voltage controller 12 to provide a high-voltage supply thereto. The power control unit could of course be provided as part of the mass spectrometry system 10, and indeed could be provided within the circuit housing 14.

The voltage controller 12 is segmented in order to separate the different high-voltage components thereof, which will be at different ground planes, which are spaced apart from one another within the circuit housing 14.

A first high-voltage control circuit 34 is provided which has a microcontroller 36 and a first high-voltage-circuit wireless communicator 38. The first high-voltage control circuit 34 is configured to control a power supply to high-voltage inputs of the ion source 18, such as the source grid 22 and/or repeller electrode 24.

A second high-voltage control circuit 40 is then also provided having a microcontroller 42 and a second high-voltage-circuit wireless communicator 44, the second high-voltage control circuit 40 being configured to control a power supply low-voltage inputs of the ion source 18. The current supply to the ionization filament 20, for example, may be controlled via the second high-voltage control circuit 40, as may be any computer control interface circuit.

Preferably, one or more commercial-off-the-shelf power supplies may be provided as high-voltage modules within the voltage controller 12, allowing for the necessary high voltages required by the ion source 18 to be generated easily.

Computer control commands from the control processor of a computer 28 are provided via the interface circuit 30, which is preferably in wired communication with the control computer 28, for example, via a USB connector. The interface circuit 30 comprises a wireless communication means, which here has a first interface wireless communicator 46, a second interface wireless communicator 48, and a microcontroller 50 which is in communication with each of the first and second interface wireless controllers 46, 48. The microcontrollers 36, 42, 50 may all preferably be provided as programmable interface controllers.

Communication between the first high-voltage-circuit wireless communicator 38 and the first interface wireless communicator 46 and between the second high-voltage-circuit wireless communicator 44 and the second interface wireless communicator 48 is enabled, each of which preferably being provided as radio-frequency (RF) communication modules. The use of such communication modules can allow for the elimination of high-voltage opto-isolators from the voltage controller 12, which not only would add bulk to the voltage controller 12, but which are also extremely prone to failure under high-voltage operating conditions.

In use, control commands for the mass spectrometer 16 can be provided by the control computer 28, for example, via a graphical user interface thereof, allowing a user to accurately set the relevant voltages or activation sequence of the mass spectrometer 16. The control signals can then be transmitted to the microcontroller 50 of the interface circuit 30.

The microcontroller 50 of the interface circuit 30 is able to activate the first and/or second interface wireless communicators 46, 48 for selectively sending appropriate control commands to the first and second high-voltage-circuit communicators 38, 44. The microcontroller 50 is able to determine in advance where the communications should be sent, and therefore which of the first and/or second interface wireless communicators 46, 48 to activate. It will, of course, be appreciated that the wireless communication means could be provided as a single communicator which is capable of communication with both of the first and second high-voltage-circuit communicators 38, 44.

Once the signals have been transmitted, the respective microcontrollers 36, 42 are able to interpret the signals are provide the appropriate controls for operating the mass spectrometer 16.

Since the control commands are communicated wirelessly to the high- and low-voltage control circuits 34, 40, there is no need for any physical wired or device connection between the circuit boards, which is dangerous where a ground plane of the microcontroller 36 of the first high-voltage control circuit 34 is at a higher voltage than a ground plane of the microcontroller 42 of the second high-voltage control circuit 40. Typically, the difference in the ground planes $\Delta V$ is of the order of 0V to 200V, usually around 75V. The likelihood of voltage over-flashing is therefore very much reduced. The size of the circuit housing unit 14 can also be significantly reduced by the elimination of the opto-isolators found in existing units. These voltage differences are illustrated in FIG. 2.

This arrangement also has the advantage of being able to provide feedback regarding the success or otherwise of the implementation of the control commands back to the control computer 28. A response confirming successful implementation can be communicated via the first and second high-voltage-circuit communicators 38, 44 back to the interface circuit 30. At least one circuit-status monitoring device may be associated with the first and/or second high-voltage control circuit 34, 40 to be able to provide the necessary status information, such as voltages or current on the power supply rails. These could be provided as digital-to-analog (DAC) or analog-to-digital (ADC) converters on the relevant circuit boards. Additional monitoring devices could be considered which provide further feedback, for instance, temperature sensors on the first or second high-voltage control circuits 34, 40.

One potential concern with the above-described arrangement is that the microcontrollers 36, 42, 50 and wireless, and in particular radio-frequency, communicators 38, 44, 46, 48 are delicate, and can be easily damaged or destroyed if exposed to voltages in excess of 5V higher than their ground plane. To this end, it may be viable to provide a voltage-protection device associated with at least one of the microcontrollers 36, 42, 50, for example, a diode, a capacitor, and/or a transient voltage suppressor in order to attempt to isolate the delicate components from potential voltage spikes.

It is therefore possible to provide a mass spectrometer system in which the voltage controller can have separate first and second high-voltage control circuits which are physically disconnected from one another and are at different ground planes to one another. Communication between the first and second high-voltage control circuits is enabled via an interface circuit and one or more wireless, preferably radio-frequency, communicator. This has the advantage of removing the need to provide opto-isolators, whilst also improving the capability to provide a portable mass spectrometer system.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A mass spectrometry system comprising:
   a mass spectrometer having an ion source having a plurality of high-voltage inputs of different voltages;
   a first high-voltage control circuit having a microcontroller and a first high-voltage-circuit wireless communicator, the microcontroller of the first high-voltage control circuit being configured to control a power supply to at least one of the plurality of high-voltage input of the ion source;
   a second high-voltage control circuit having a microcontroller and a second high-voltage-circuit wireless communicator, the microcontroller of the second high-voltage control circuit being configured to control a power supply to at least one of the plurality of high-voltage inputs; and
   an interface circuit comprising a wireless communication means, and a microcontroller which is in communication with the wireless communication means;
   wherein the first and second high-voltage control circuits are physically spaced apart from and are at different ground planes to one another, the interface circuit providing communication therebetween by communication between the wireless communication means and the first and second high-voltage wireless communicators.

2. A mass spectrometry system as claimed in claim 1, wherein at least one of the first and second wireless communicators and wireless communication means comprises a radio-frequency communication module.

3. A mass spectrometry system as claimed in claim 1, further comprising a circuit housing unit, the first high-voltage control circuit and the second high-voltage control circuit being housed within the circuit housing unit in a spaced apart configuration.

4. A mass spectrometry system as claimed in claim 3, further comprising a power control unit which is separate to the circuit housing unit.

5. A mass spectrometry system as claimed in claim 3, wherein the mass spectrometry system has dimensions of less than or equal to 60 cm×60 cm×25 cm.

6. A mass spectrometry system as claimed in claim 3, wherein the circuit housing unit has dimensions of less than or equal to 45 cm×25 cm×15 cm.

7. A mass spectrometry system as claimed in claim 6, wherein the circuit housing unit has dimensions of less than or equal to 21 cm×20 cm×8 cm.

8. A mass spectrometry system as claimed in claim 3, wherein there is a spacing of at least 5 cm between side walls of a housing for the mass spectrometry system and the circuit housing unit.

9. A mass spectrometry system as claimed in claim 1, further comprising a high-voltage power supply connected to at least one of the first and second high-voltage control circuits.

10. A mass spectrometry system as claimed in claim 1, wherein the second high-voltage control circuit comprises an ionization source filament control circuit for controlling an ionization filament of the ion source.

11. A mass spectrometry system as claimed in claim 1, further comprising at least one circuit-status monitoring device associated with the first and/or second high-voltage control circuit.

12. A mass spectrometry system as claimed in claim 1, further comprising a voltage-protection device associated with at least one of the microcontrollers.

13. A mass spectrometry system as claimed in claim 12, wherein the or each voltage-protection device comprises any or all of: a diode; a capacitor; and a transient voltage suppressor.

14. A mass spectrometry system as claimed in claim 1, wherein the wireless communication means of the interface circuit comprises a first interface wireless communicator and a second interface wireless communicator, the microcontroller of the interface circuit being in communication with each of the first and second interface wireless communicators, the interface circuit providing communication between the first and second high-voltage control circuits by communication between the first high-voltage-circuit wireless communicator and the first interface wireless communicator and between the second high-voltage-circuit wireless communicator and the second interface wireless communicator.

15. A mass spectrometry system as claimed in claim 1, further comprising a control processor which is communicably coupled to the interface circuit.

16. A mass spectrometry system as claimed in claim 1, wherein the first high-voltage control circuit and the second high-voltage control circuit are devoid of opto-isolators.

* * * * *